(12) United States Patent
Mizuishi et al.

(10) Patent No.: US 11,906,031 B2
(45) Date of Patent: Feb. 20, 2024

(54) VEHICLE (71) Applicant: KAWASAKI MOTORS, LTD., Akashi (JP)

(72) Inventors: Shohei Mizuishi, Akashi (JP); Masahiro Mizuno, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/805,415

(22) Filed: Jun. 3, 2022

(65) Prior Publication Data

US 2023/0392681 A1 Dec. 7, 2023

(51) Int. Cl.
*F16H 57/04* (2010.01)
*F16H 59/72* (2006.01)
*F16H 59/44* (2006.01)

(52) U.S. Cl.
CPC ..... *F16H 57/0413* (2013.01); *F16H 57/0405* (2013.01); *F16H 57/0446* (2013.01); *F16H 59/44* (2013.01); *F16H 59/72* (2013.01)

(58) Field of Classification Search
CPC ....... B60W 30/18118; B60W 30/18063; F16H 2312/04; F16H 2312/06; F16H 61/20; F16H 57/0413; F16H 57/0405; F16H 57/0446; F16H 59/44; F16H 59/72
See application file for complete search history.

(56) References Cited

U.S. PATENT DOCUMENTS

| 2003/0130089 | A1 | 7/2003 | Hori et al. | |
| 2003/0136447 | A1* | 7/2003 | Hori | F16H 57/0434 |
| | | | | 137/565.13 |
| 2006/0172855 | A1* | 8/2006 | Pollak | F16D 48/062 |
| | | | | 477/70 |
| 2010/0048354 | A1* | 2/2010 | Leibbrandt | F16H 61/688 |
| | | | | 477/172 |
| 2017/0248197 | A1* | 8/2017 | Muto | F16H 61/0059 |

FOREIGN PATENT DOCUMENTS

| JP | 2002067741 A | * | 3/2002 | ............. F16H 61/04 |
| JP | 2003139167 A | | 5/2003 | |

* cited by examiner

Primary Examiner — Tisha D Lewis
(74) Attorney, Agent, or Firm — Alleman Hall & Tuttle LLP (57) ABSTRACT A vehicle includes: an interrupter including a first connector connected to a driving source, a second connector connected to a transmission, and a fluid in a gap between the first and second connectors; and processing circuitry. The processing circuitry receives flowability information indicating a value related to flowability of the fluid. The processing circuitry determines whether or not a predetermined power interruption condition is satisfied. When the above condition is satisfied, and the processing circuitry determines that the value is less than a predetermined reference value, the processing circuitry controls the speed change actuator to set the transmission to a first gear stage. When the condition is satisfied, and the processing circuitry determines that the value is not less than the reference value, the processing circuitry controls the speed change actuator to set the transmission to a second gear stage having a lower reduction ratio than the first gear stage.

15 Claims, 6 Drawing Sheets

VEHICLE

BACKGROUND OF THE INVENTION

Field of the Invention

The present disclosure relates to a vehicle, such as an all terrain vehicle, including an interrupter that establishes or cuts an output transmitting route through which an output of a traveling driving source is transmitted to a transmission.

Description of the Related Art

Japanese Laid-Open Patent Application Publication No. 2003-139167 discloses an all terrain vehicle that travels rough roads and the like. This type of vehicle includes a hydraulic multiple disc clutch that establishes or cuts a power transmitting route through which an output of a traveling internal combustion engine is transmitted to a transmission. Lubricating oil is in a hydraulic multiple disc clutch. The vehicle may cause a creep phenomenon in which the clutch transmits power by the lubricating oil as a medium, and this moves the vehicle.

SUMMARY OF THE INVENTION

A vehicle according to one aspect of the present disclosure includes: a traveling driving source; a transmission including a speed change actuator and a speed change structure that is driven by the speed change actuator to change a speed of driving power of the driving source; an interrupter that includes a first connector connected to the driving source, a second connector connected to the transmission, and a fluid in a gap between the first connector and the second connector, and establishes or interrupts a power transmitting route through which the driving power is transmitted from the first connector to the second connector; processing circuitry that controls the speed change actuator of the transmission; and a driving wheel to which the driving power of the driving source is transmitted. The processing circuitry receives flowability information indicating a value related to flowability of the fluid. The processing circuitry determines whether or not a predetermined power interruption condition for interrupting transmission of the driving power from the driving source to the driving wheel is satisfied. When the power interruption condition is satisfied, and the processing circuitry determines that the value related to the flowability is less than a predetermined reference value, the processing circuitry controls the speed change actuator to set the transmission to a first gear stage. When the power interruption condition is satisfied, and the processing circuitry determines that the value related to the flowability is not less than the reference value, the processing circuitry controls the speed change actuator to set the transmission to a second gear stage having a lower reduction ratio than the first gear stage.

DESCRIPTION OF THE PREFERRED EMBODIMENTS

Hereinafter, embodiments will be described with reference to the drawings.

Embodiment 1

Figure 1:
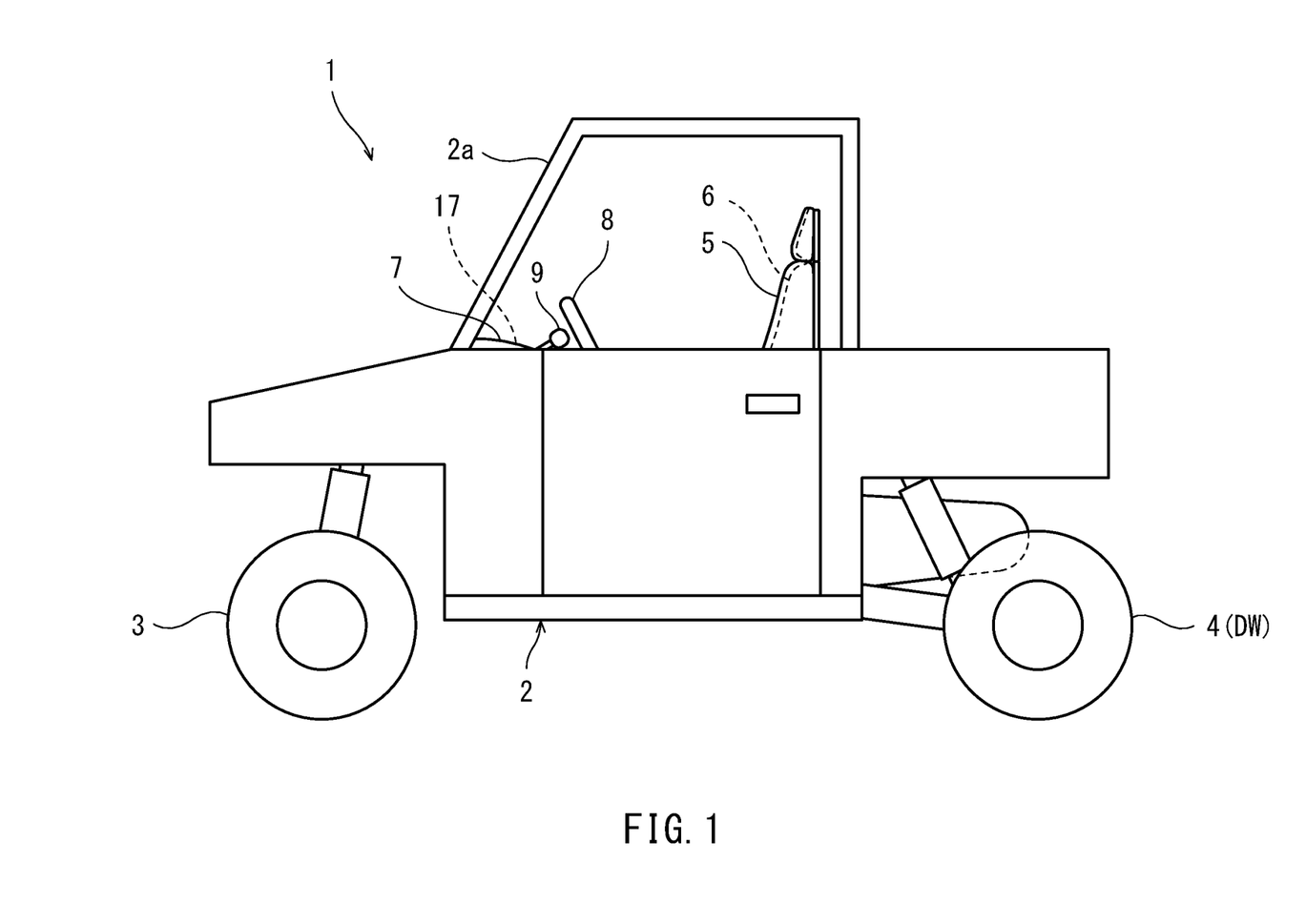
FIG. 1 is a side view of a vehicle according to Embodiment 1.

FIG. 1 is a side view of a vehicle 1 according to Embodiment 1. The vehicle 1 shown in FIG. 1 is an all terrain vehicle as one example and is an utility vehicle in the present embodiment. Moreover, as one example, the vehicle 1 is a side-by-side vehicle on which occupants get side by side. The vehicle 1 includes a vehicle body frame 2, a pair of left and right front wheels 3, and a pair of left and right rear wheels 4. Tires of the front wheels 3 and the rear wheels 4 are balloon tires, and the type of the tire is not limited to this. The vehicle 1 includes a driving wheel DW to which driving power of a below-described driving source E is transmitted. The driving wheel DW is selected from at least one of the front wheels 3 or the rear wheels 4. As one example, the driving wheel DW of the present embodiment correspond to the rear wheels 4.

The vehicle body frame 2 includes a pipe frame portion. The pipe frame portion includes pipes connected to each other. The vehicle body frame 2 includes a cabin frame 2a surrounding an interior space where a driver's seat 5 and a front passenger seat 6 are arranged. A dash panel 7 is arranged in front of the driver's seat 5 and the front passenger seat 6. A steering wheel 8 and a shift lever 9 are disposed at the dash panel 7. A driver controls the steering wheel 8 to steer the vehicle 1. The driver controls the shift lever 9 to perform a shifting operation. Moreover, the vehicle 1 further includes a display 17 that displays a gear stage of a below-described transmission TM.

Figure 2:
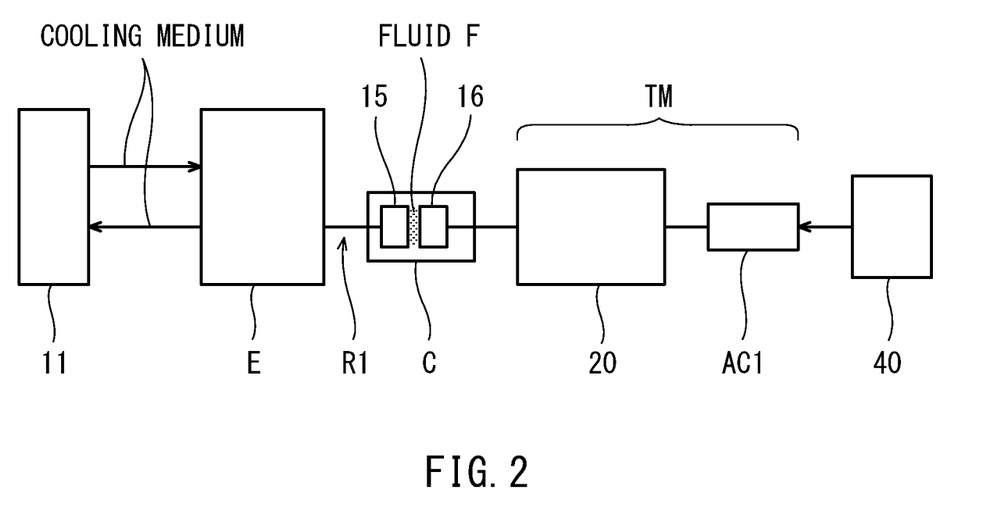
FIG. 2 is a block diagram showing a part of the configuration of the vehicle of FIG. 1.

FIG. 2 is a block diagram showing a part of the configuration of the vehicle 1 of FIG. 1. As shown in FIG. 2, the vehicle 1 includes: the traveling driving source E; the transmission TM that changes the speed of the driving power of the driving source E; an interrupter C that establishes or interrupts the transmission of the power from the driving source E to the transmission TM; and a radiator 11 that cools a cooling medium that has cooled the driving source E. The cooling medium circulates between the radiator 11 and the driving source E. The driving power of the driving source E which has been changed in speed by the transmission TM is transmitted to the driving wheel DW.

The driving source E includes at least an internal combustion engine. In addition to the internal combustion engine, the driving source E may include a traveling electric motor. To be specific, the vehicle 1 may be a hybrid vehicle. As one example, the interrupter C of the present embodiment is controlled by a controller 40 (see FIG. 5) that is an ECU (Electronic Control Unit) included in the vehicle 1. The interrupter C may be controlled by, for example, a manual operation of the driver. As described below, the vehicle 1 is appropriately prevented from causing a creep phenomenon in which the driving power of the driving source E is transmitted to the transmission TM through a medium that is a fluid F in the interrupter C at a timing that is not intended by the driver, and this moves the vehicle 1.

The interrupter C includes: a first connector 15 connected to the driving source E; a second connector 16 connected to the transmission TM; and the fluid F in a gap between the first connector 15 and the second connector 16. The transmission TM includes: a speed change actuator AC1; and a speed change structure 20 that is driven by the speed change actuator AC1 to change the speed of the driving power of the driving source E.

The interrupter C establishes or interrupts a power transmitting route R1 through which the driving power of the driving source E is transmitted from the first connector 15 to the second connector 16. In the vehicle 1, the interrupter C is arranged at a portion of the power transmitting route R1. One example of the fluid F in the present embodiment is oil. This oil is lubricating oil that lubricates a lubricated portion of the driving source E or a lubricated portion of a power transmitting structure (including the interrupter C) that transmits the driving power of the driving source E from the driving source E to the driving wheel DW. The flowability of the fluid F changes in accordance with temperature. Specifically, the flowability of the fluid F increases as the temperature thereof increases, and the flowability of the fluid F decreases as the temperature thereof decreases. The vehicle 1 further includes the controller 40 as a component of processing circuitry that controls the speed change actuator AC1.

Figure 3:
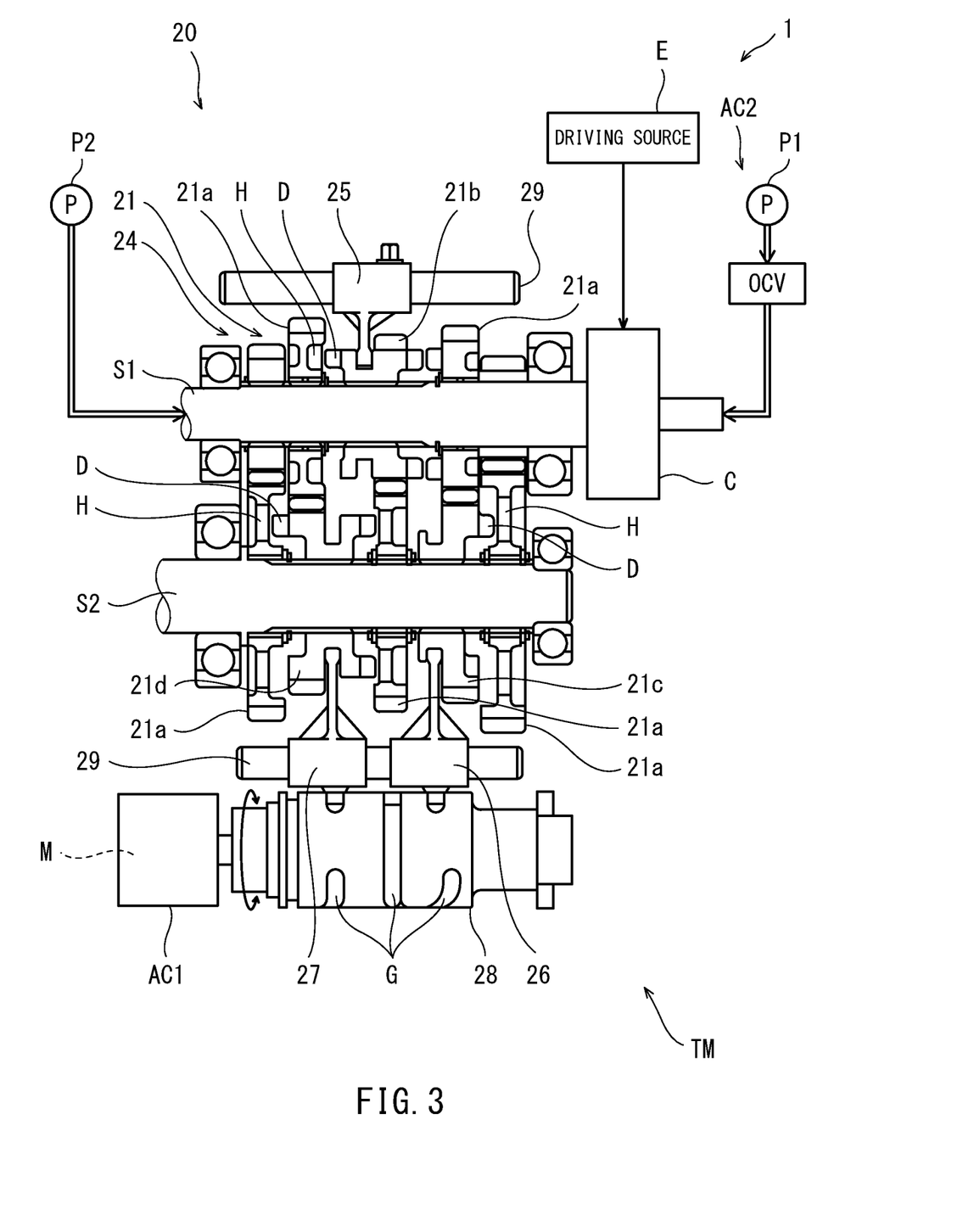
FIG. 3 is a diagram showing an internal configuration of a speed change structure of FIG. 2.

FIG. 3 is a diagram showing an internal configuration of the speed change structure 20 of FIG. 2. FIG. 3 shows a section obtained by cutting the speed change structure 20 along a flat plane that passes through shafts S1 and S2 included in the speed change structure 20. The speed change structure 20 shown in FIG. 3 is a stepped speed change structure as one example and is specifically a gear speed change structure. The speed change structure 20 includes: an input shaft S1 to which the driving power of the driving source E is input; speed change gear pairs 21 having respective reduction ratios different from each other; and an output shaft S2 that outputs the driving power of the driving source E which has been changed in speed. The speed change structure 20 selectively sets a desired one of the speed change gear pairs 21 to a power transmitting state to change the rotational speed of the driving power of the driving source E which is to be transmitted from the input shaft S1 to the output shaft S2. In the speed change structure 20 of the present embodiment, as one example, the driving power is transmitted to the input shaft S1 from a crank shaft of the internal combustion engine included in the driving source E. The power of the output shaft S2 is transmitted to the driving wheel DW. The interrupter C is interposed between the driving source E and the input shaft S1. The interrupter C can continuously change a power transmission rate from a cut state to a completely connected state.

The speed change structure 20 is a dog gear speed change structure as one example. The speed change structure 20 selects one of the speed change gear pairs 21 in association with the speed change actuator AC1 to select a predetermined one of gear stages and perform speed change. The speed change structure 20 includes gears 21a, dog gears 21b to 21d (engagers), shift forks 25 to 27, and a shift drum 28. The gears 21a are fitted to the input shaft S1 or the output shaft S2 so as to be rotatable. The dog gears 21b to 21d are fitted to the input shaft S1 or the output shaft S2 so as to rotate together with the input shaft S1 or the output shaft S2.

Each gear 21a has a dog hole H on a side surface thereof. Each of the dog gears 21b to 21d includes a dog D that projects from a side surface thereof toward the adjacent gear 21a. The dog gear 21b is disposed at the input shaft S1 so as to be slidable. The dog gears 21c and 21d are disposed at the output shaft S2 so as to be slidable. Each gear 21a may include the dog D, and each of the dog gears 21b to 21d may include the dog hole H.

The shift forks 25 to 27 are supported by spindles 29, which are in parallel with the input shaft S1 and the output shaft S2, so as to be slidable. A tip portion of the shift fork 25 is connected to the dog gear 21b of the input shaft S1. A tip portion of the shift fork 26 is connected to the dog gear 21c of the output shaft S2, and a tip portion of the shift fork 27 is connected to the dog gear 21d of the output shaft S2. Base end portions of the shift forks 25 to 27 are fitted to guide grooves G on an outer peripheral surface of the shift drum 28.

The speed change actuator AC1 is connected to the shift drum 28. The shift drum 28 is driven by the speed change actuator AC1 to rotate. The speed change actuator AC1 includes an electric motor M. The shift drum 28 rotates about an axis thereof by the rotational driving force of the electric motor M.

The shift forks 25 to 27 guided by the guide grooves G of the rotating shift drum 28 make the corresponding dog gears 21b to 21d slide along the input shaft S1 or the output shaft S2. With this, any of the dogs D of the dog gears 21b to 21d is engaged with any of the dog holes H of the gears 21a. As a result, one speed change gear pair 21 having a target reduction ratio among the speed change gear pairs 21 becomes the power transmitting state, and thus, a desired gear stage is selected. To be specific, each of the dog gears 21b to 21d serves as a gear selector that is selectively engaged with a desired one of the gears 21a to realize the desired gear stage.

In the present embodiment, the gear selector that is made to slide by the shift fork is used as the dog gear. However, instead of the dog gear, a dog that is not a gear may be used as the gear selector.

As will be described later in detail, the interrupter C of the present embodiment is supplied with operating oil through an oil control valve OCV by an operating oil supply pump P1 included in the vehicle 1. Moreover, the interrupter C is supplied with lubricating oil by a lubricating oil supply pump P2 included in the vehicle 1. As one example, the oil supplied from the pump P1 and the oil supplied from the pump P2 are supplied to the interrupter C through an inside of the input shaft S1.

Figure 4:
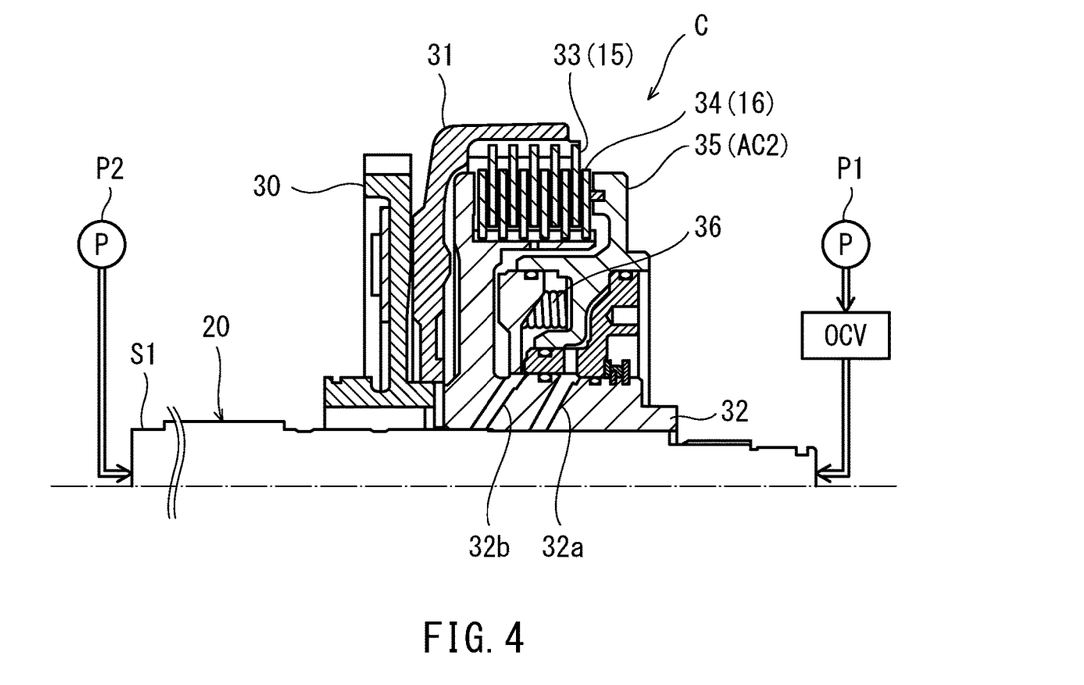
FIG. 4 is a diagram showing a part of the configuration of an interrupter of FIG. 3.

FIG. 4 is a diagram showing a part of the configuration of the interrupter C of FIG. 3. As one example, the interrupter C of the present embodiment shown in FIG. 4 is a friction clutch in which the driving power of the driving source E is transmitted from the first connector 15 to the second connector 16 by frictional contact between the first connector 15 and the second connector 16. The interrupter C transmits the power by bringing the connectors 15 and 16 into contact with each other and interrupts the transmission of the power by separating the connectors 15 and 16 from each other. The interrupter C is more specifically a hydraulic multiple disc clutch.

The interrupter C includes: a primary gear 30 to which the driving power of the driving source E is transmitted; and a clutch outer 31 fixed to the primary gear 30. The clutch outer 31 is arranged so as to be rotatable about an axis of the input shaft S1 of the speed change structure together with the primary gear 30. Moreover, the interrupter C includes a clutch inner 32 arranged inside the clutch outer 31 in a radial direction of the input shaft S1 and fixed to the input shaft S1.

First friction plates 33 arranged at intervals in an axial direction of the input shaft S1 are disposed on a surface, facing the input shaft S1, of the clutch outer 31. Second friction plates 34 arranged at intervals in the axial direction of the input shaft S1 are disposed at the clutch inner 32 so as to be located alternately with the first friction plates 33 in the axial direction of the input shaft S1. The first friction plate 33 is one example of the first connector 15, and the second friction plate 34 is one example of the second connector 16.

The vehicle 1 further includes an interrupter actuator AC2 that drives the first connector 15 and the second connector 16 by hydraulic pressure such that the first connector 15 and the second connector 16 are brought into contact with each other or are separated from each other. The vehicle 1 of the present embodiment further includes the pump P1 that applies the hydraulic pressure of the operating oil to the interrupter C. The interrupter C further includes a press 35 that drives the first friction plates 33 and the second friction plates 34 based on the hydraulic pressure of the operating oil applied by the pump P1 such that the first friction plates 33 and the second friction plates 34 are brought into contact with each other or are separated from each other. The press 35 is one example of the interrupter actuator AC2. As one example, the press 35 presses the plates 33 and 34 in a thickness direction by moving toward the primary gear along the axial direction of the input shaft S1 by the hydraulic pressure of the operating oil supplied by the pump P1 to an operating oil passage 32a of the clutch inner 32. With this, the press 35 brings the plates 33 and 34 into contact with each other. Moreover, when the hydraulic pressure of the operating oil decreases, the press 35 moves away from the primary gear 30 in the axial direction of the input shaft S1 by biasing force of a biasing structure 36 (for example, a spring) disposed inside the clutch inner 32. With this, the press 35 separates the plates 33 and 34 from each other.

When the first friction plates 33 and the second friction plates 34 are brought into contact with each other, the driving power of the driving source E is transmitted to the input shaft S1 through the primary gear 30, the clutch outer 31, and the clutch inner 32 in this order. With this, the power transmitting route R1 (see FIG. 2) is established. Moreover, when the first friction plates 33 and the second friction plates 34 are separated from each other, the transmission of the power between the clutch outer 31 and the clutch inner 32 is interrupted. With this, the power transmitting route R1 is interrupted. The fluid F is in respective gaps between the first friction plates 33 and the second friction plates 34. In the present embodiment, the fluid F that is the lubricating oil is supplied to the respective gaps by the pump P2. As one example, the fluid F flows through a lubricating oil passage 32b of the clutch inner 32 to be supplied to the respective gaps by the pump P2. The fluid F lubricates and cools the first friction plates 33 and the second friction plates 34. In addition to the above hydraulic multiple disc clutch, specific examples of the interrupter C include: a magnetic fluid clutch using a magnetorheological (MR) fluid; and a torque converter. However, the interrupter C is not limited to these.

Figure 5:
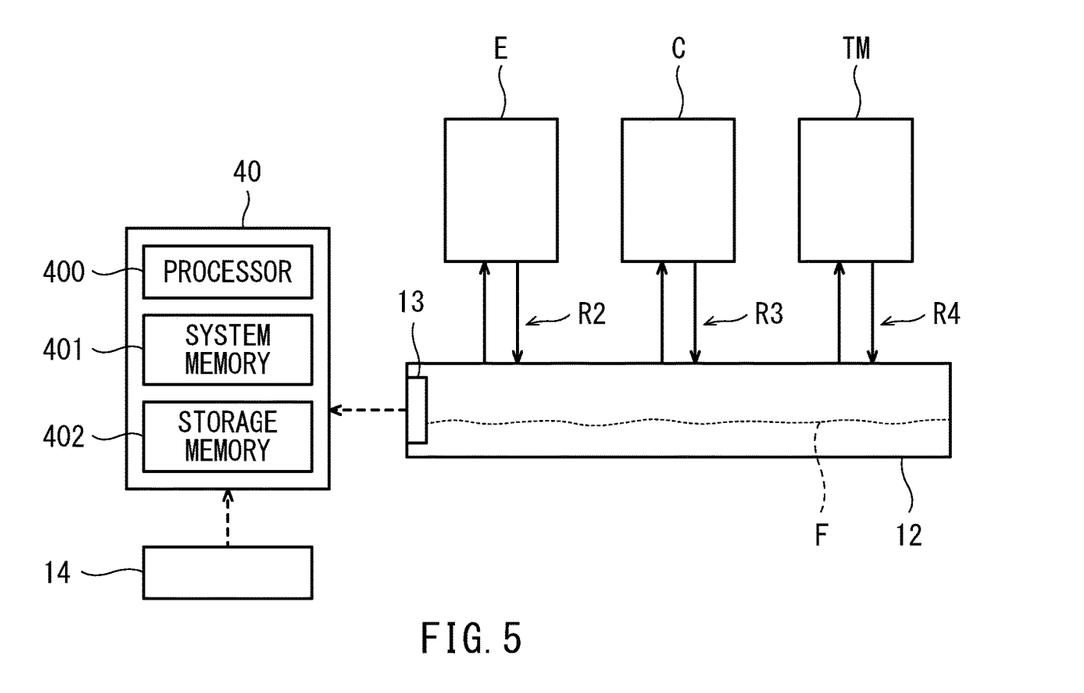
FIG. 5 is a block diagram showing a pan of the vehicle of FIG. 1 and its peripheral components.

Moreover, the vehicle 1 further includes a temperature sensor that detects the temperature of the fluid F. The processing circuitry receives a detection signal of the temperature sensor. FIG. 5 is a block diagram showing a pan 12 of the vehicle 1 of FIG. 1 and its peripheral components.

As shown in FIG. 5, the vehicle 1 includes: the pan (storage) 12 that stores the fluid F; and a temperature sensor 13 that detects the temperature of the fluid F stored in the pan 12. A detection signal of the temperature sensor 13 is transmitted to the controller 40. With this, the processing circuitry receives the detection signal of the temperature sensor 13. The pan 12 is connected to the driving source E. As one example, the pan 12 of the present embodiment is an oil pan that stores the fluid F that is the lubricating oil. As one example, the pan 12 is connected to a lower portion of the driving source E. With this, heat is transferred from the driving source E to the pan 12 and the fluid F stored in the pan 12. The vehicle 1 includes: a circulation passage R2 through which the fluid F circulates between the pan 12 and the driving source E; a circulation passage R3 through which the fluid F circulates between the pan 12 and the interrupter C; and a circulation passage R4 through which the fluid F circulates between the pan 12 and the transmission TM. The fluid F that is the lubricating oil of the present embodiment lubricates the driving source E, the interrupter C, and the transmission TM. A part of one of the passages R2 to R4 may be used as a part of another one of the passages R2 to R4.

The controller 40 includes: at least one memory storing a control program that controls the speed change actuator AC1; and at least one processor that can execute the control program. As a specific example, the controller 40 includes a processor 400, a system memory 401, and a storage memory 402. The processor 400 may include a CPU (central processing unit). Each of the memories 401 and 402 is one example of a computer-readable medium. The computer-readable medium is a non-transitory tangible medium. The system memory 401 may include a RAM. The storage memory 402 may include a ROM. The storage memory 402 may include a hard disk and/or a flash memory. The storage memory 402 stores a control program executed by the CPU 400. A configuration in which the processor 400 controls the actuator AC1 of the transmission TM by executing the control program read from the storage memory 402 onto the system memory 401 is one example of the processing circuitry that controls the speed change actuator AC1 of the transmission TM.

Moreover, the vehicle 1 of the present embodiment includes a vehicle sensor 14. The controller 40 receives a detection signal of the vehicle sensor 14. As one example, the controller 40 controls the driving source E and the like based on the detection signal of the vehicle sensor 14. The vehicle sensor 14 may include: an accelerator sensor that detects an acceleration requested amount of the driver of the vehicle 1; a detection sensor that detects a rotational frequency of the driving source E; a detection sensor that detects a rotational frequency of a prime mover of a power unit 10; a speed sensor that detects a traveling speed of the vehicle 1; an acceleration sensor that detects an acceleration of the vehicle 1; or any combination thereof. The vehicle 1 may include controllers instead of the single controller 40.

According to the vehicle 1 having the above configuration, the fluid F is in the gap between the first connector 15 and the second connector 16 in the interrupter C. When the temperature of the fluid F decreases, the flowability thereof decreases. When the flowability of the fluid F decreases, the transmission of the power between the first connector 15 and the second connector 16 is performed by using the fluid F as a medium. With this, the creep phenomenon in which the vehicle 1 moves by the transmission of the power of the driving source E to the transmission TM (i.e., a phenomenon in which the vehicle 1 travels even though the driver does not step on the accelerator) may occur. To prevent the occurrence of the creep phenomenon, the processing circuitry performs the following steps based on the control program.

To be specific, the processing circuitry performs: receiving flowability information indicating a value V1 related to the flowability of the fluid F (Step 1); determining whether or not a predetermined power interruption condition for interrupting the transmission of the driving power from the driving source E to the driving wheel DW is satisfied (Step 2); and when the power interruption condition is satisfied, and the processing circuitry determines that the value V1 related to the flowability is a predetermined reference value V0 or less, controlling the speed change actuator AC1 to set the transmission TM to a gear stage having a reduction ratio lower than a maximum reduction ratio (Step 3).

When the processing circuitry performs Steps 1 to 3, and the gear stage of the transmission TM is set to the gear stage having the reduction ratio lower than the maximum reduction ratio, the torque of the output of the transmission TM is reduced to, for example, torque that cannot drive the driving wheel DW. With this, for example, even when the driving power of the driving source E is transmitted to the transmission TM through the fluid F, the start of the traveling of the vehicle is restricted. Therefore, the occurrence of the creep phenomenon due to the fluid F can be prevented without taking a significant measure for the vehicle 1.

As one example, the power interruption condition of the present embodiment includes a condition that the vehicle speed is less than a predetermined threshold. In this case, the processing circuitry receives the detection signal of the vehicle sensor 14 that is, for example, a sensor that detects the traveling speed of the vehicle 1. Moreover, the power interruption condition includes a condition that the vehicle speed is less than the threshold, and the rotation of the driving source E is maintained. Furthermore, the power interruption condition includes a condition that a parking brake or a foot brake included in the vehicle 1 is not operated, and the rotation of the driving source E is maintained. The processing circuitry determines based on the detection signal of the vehicle sensor 14 whether or not the power interruption condition including the condition that the vehicle speed is less than the predetermined threshold is satisfied. With this, the power interruption condition is accurately set based on the vehicle speed.

Moreover, the value V1 includes, for example, a value related to the viscosity of the fluid F. Since the processing circuitry performs determination by using the value related to the viscosity that is a basic characteristic of the fluid F, the creep phenomenon caused by the fluid F can be appropriately prevented. The value V1 may include a value related to a pressure value of the fluid F measured at a predetermined position of the vehicle 1 or a flow velocity of the fluid F measured at a predetermined position of the vehicle 1.

As one example, in addition to Steps 1 and 2, the processing circuitry of the present embodiment performs: when the power interruption condition is satisfied, and the processing circuitry determines that the value V1 is less than the reference value V0, controlling the speed change actuator AC1 to set the transmission TM to a first gear stage (Step 4); and when the power interruption condition is satisfied, and the processing circuitry determines that the value V1 is not less than the reference value V0, controlling the speed change actuator AC1 to set the transmission TM to a second gear stage having a lower reduction ratio than the first gear stage (Step 5). Step 5 corresponds to a specific example of Step 3.

As above, according to the vehicle 1 of the present embodiment, when the power interruption condition is satisfied, and the processing circuitry determines that the value V1 is less than the reference value V0, the processing circuitry controls the speed change actuator AC1 to set the gear stage of the transmission TM to the second gear stage. With this, the torque of the output of the transmission TM can be reduced to, for example, torque that cannot drive the driving wheel DW. Therefore, the creep phenomenon caused due to the fluid F can be prevented. Moreover, when the power interruption condition is satisfied, and the processing circuitry determines that the value V1 is not less than the reference value V0, the processing circuitry controls the speed change actuator AC1 to set the gear stage of the transmission TM to the first gear stage. With this, the vehicle 1 can smoothly start traveling.

Moreover, according to the vehicle 1 of the present embodiment, as one example, the processing circuitry receives the detection signal of the temperature sensor 13, and the value V1 includes the temperature of the fluid F. According to this configuration, since the value V1 includes the temperature of the fluid F that is a factor which easily influences the flowability of the fluid F, the occurrence of the creep phenomenon due to the fluid F can be appropriately prevented based on the flowability of the actual fluid F. The temperature sensor 13 is arranged so as to measure, for example, the temperature of the driving source E or an outside temperature of the vehicle 1. The processing circuitry may estimate the temperature of the fluid F based on the detection signal of the temperature sensor 13.

Moreover, according to the vehicle 1 of the present embodiment, the temperature sensor 13 detects the temperature of the fluid F stored in the pan 12. According to this configuration, for example, by using the existing pan 12 and the existing temperature sensor 13 included in the vehicle 1, the value V1 can be obtained by detecting the temperature of the fluid F stored in the pan 12 without using a large-scale facility. Furthermore, the fluid F of the present embodiment is the lubricating oil. Therefore, the creep phenomenon caused due to the lubricating oil can be prevented. The temperature sensor 13 may measure the temperature of the fluid F that is the lubricating oil (engine oil) flowing in the driving source E.

Moreover, according to the vehicle 1 of the present embodiment, as one example, the processing circuitry performs: when the gear stage of the transmission TM is the second gear stage, and the vehicle 1 is in a stop state, acquiring traveling start information indicating that the vehicle 1 starts traveling (Step 6); and controlling the speed change actuator AC1 in accordance with the acquisition of the traveling start information to change the gear stage of the transmission TM from the second gear stage to a gear stage having a higher reduction ratio than the second gear stage (Step 7). With this, when the power interruption condition is satisfied, the gear stage of the transmission TM is set to the second gear stage, and then, the vehicle 1 can smoothly start traveling in accordance with the acquisition of the traveling start information.

Herein, the "traveling start information" includes for example, at least one of an accelerator opening degree of the vehicle 1, a throttle opening degree of the driving source E, or a rotational frequency of the driving source E. Moreover, the "traveling start information" may include traveling start preparation information indicating that the start of the traveling of the vehicle 1 is in preparation. The processing circuitry acquires such information through signals, such as the detection signal of the vehicle sensor 14, received from outside. Furthermore, when the vehicle 1 starts traveling based on an automatic driving traveling start command received from outside (in other words, when the vehicle 1 is controlled by radio), the "traveling start information" may include information of this traveling start command. Next, modified examples of the present embodiment will be described.

Modified Example 1

The vehicle 1 according to Modified Example 1 further includes: a circulation passage through which the fluid F circulates inside the driving source E; and a detection sensor that detects a state of the fluid F flowing through the circulation passage. In Modified Example 1, the fluid F may be a fluid that circulates inside the driving source E. The fluid F in Modified Example 1 is, for example, the lubricating oil that lubricates the lubricated portion in the driving source E but is not limited to this. As the state of the fluid F that circulates inside the driving source E, the detection sensor detects, for example, the temperature or pressure of the fluid F. The detection signal of the detection sensor is transmitted to the processing circuitry. As one example, the detection sensor of Modified Example 1 is a temperature sensor that detects the temperature of the fluid F.

Since the driving source E is connected to the interrupter C, the temperature of the fluid F in the driving source E is proportional to the temperature of the fluid F in the interrupter C. When the temperature of the fluid F in the driving source E is high, the fluid F in the interrupter C is high in temperature and pressure and is also high in flowability. Moreover, when the temperature of the fluid F in the driving source E is low, the fluid F in the interrupter C is low in temperature and pressure and is also low in flowability. Therefore, when the temperature or pressure of the fluid F in the driving source E is lower than a certain value, there is a possibility that since the fluid F in the interrupter C is in the gaps, the creep phenomenon occurs due to the fluid F. On this account, in Modified Example 1, as one example, the value V1 includes the temperature of the fluid F flowing in the driving source E. In Modified Example 1, since the processing circuitry performs Steps 1 to 3 or Steps 1, 2, and 4, the occurrence of the creep phenomenon due to the fluid F can be appropriately prevented.

Modified Example 2

According to the vehicle 1 of Modified Example 2, the flowability information includes at least one of: information I1 regarding power transmitting efficiency between the driving source E and the transmission TM; information I2 regarding the driving source E and the vehicle speed; information I3 regarding pump pressure of a pump that is included in the vehicle 1 and pressurizes the fluid F; and information I4 regarding the deterioration of the fluid F. According to this configuration, the flowability information based on a factor that easily influences the flowability of the fluid F or the flowability information based on a factor that is easily influenced by the flowability of the fluid F can be used. Therefore, the occurrence of the creep phenomenon due to the fluid F can be appropriately prevented.

When the flowability information includes the information I1, the vehicle includes, for example, the following configuration. The vehicle 1 includes, for example, a torque sensor that detects the torque of the output of the transmission TM. The controller 40 receives the detection signal of the torque sensor. As one example, the information I1 includes a detection value Ts of the detection signal of the torque sensor. Herein, when the detection value Ts of the torque sensor is not less than a predetermined torque reference value Tv1, the vehicle 1 may be in a state where: the flowability of the fluid F decreases; the transmission of the power from the driving source E to the transmission TM is performed; and the creep phenomenon due to the fluid F occurs. Therefore, the detection value Ts of the torque sensor can be utilized as the flowability information indicating a value related to the flowability of the fluid F.

Specifically, when the power interruption condition is satisfied, the processing circuitry determines whether or not the detection value Ts is not less than the torque reference value Tv1 that is a predetermined reference value. When the processing circuitry determines that the detection value Ts is less than the torque reference value Tv1, the processing circuitry controls the speed change actuator AC1 to set the transmission TM to the first gear stage. Moreover, when the processing circuitry determines that the detection value Ts is not less than the torque reference value Tv1, the processing circuitry controls the speed change actuator AC1 to set the transmission TM to the second gear stage.

When the flowability information includes the information I2, the vehicle 1 includes, for example, the following configuration. The vehicle 1 includes, for example, a torque sensor that detects the torque of the output of the transmission TM. The controller 40 receives the detection signal of the torque sensor. Moreover, the storage memory 402 of the vehicle 1 prestores a torque map indicating a relation between the rotational frequency of the driving source E and the torque of the output of the transmission TM or a torque map indicating a relation between the throttle opening degree of the driving source E and the torque of the output of the transmission TM. The torque map is suitably read by the processor 400 from the storage memory 402 onto the system memory 401.

As one example, the information I2 includes a differential value Dv between: a torque value indicated by the torque map in accordance with the rotational frequency of the driving source E or the throttle opening degree of the driving source E at a predetermined timing while the vehicle is traveling; and a torque value indicated by the detected value of the torque sensor at the predetermined timing. When the differential value Dv is not less than a predetermined torque reference value Tv2, the vehicle 1 may be in a state where: the flowability of the fluid F decreases; and the creep phenomenon due to the fluid F occurs by the transmission of the power from the driving source E to the transmission TM. Therefore, the differential value Dv can be utilized as the flowability information indicating the value related to the flowability of the fluid F.

Specifically, the processing circuitry stores the differential value Dv in the storage memory 402 at a predetermined timing while the vehicle is traveling. After that, when the power interruption condition is satisfied, the processing circuitry determines whether or not the stored differential value Dv is not less than the torque reference value Tv2 that is a predetermined reference value. When the processing circuitry determines that the differential value Dv is less than the torque reference value Tv2, the processing circuitry controls the speed change actuator AC1 to set the transmission TM to the first gear stage. Moreover, when the processing circuitry determines that the differential value Dv is not less than the torque reference value Tv2, the processing circuitry controls the speed change actuator AC1 to set the transmission TM to the second gear stage.

When the flowability information includes the information I3, the vehicle includes, for example, the following configuration. The vehicle includes, for example, a pressure sensor that detects pump pressure of the pump P2 that supplies the oil, stored in the pan 12, to the interrupter C. The controller 40 receives a detection signal of the pressure sensor. As one example, the information I3 includes a detection value Psi of the detection signal of the pressure sensor. Herein, when the detection value Psi of the pressure sensor is not less than a predetermined pressure reference value Ps, the vehicle may be in a state where: the flowability of the fluid F decreases; the transmission of the power from the driving source E to the transmission TM is performed; and the creep phenomenon due to the fluid F occurs. Therefore, the detection value Psi of the pressure sensor can be utilized as the flowability information indicating the value related to the flowability of the fluid F.

Specifically, when the power interruption condition is satisfied, the processing circuitry determines whether or not the detection value Psi of the pressure sensor is not less than a pressure reference value Ps0 that is a predetermined reference value. When the processing circuitry determines that the detection value Psi of the pressure sensor is less than the pressure reference value Ps0, the processing circuitry controls the speed change actuator AC1 to set the transmission TM to the first gear stage. Moreover, when the processing circuitry determines that the detection value Psi of the pressure sensor is not less than the pressure reference value Ps0, the processing circuitry controls the speed change actuator AC1 to set the transmission TM to the second gear stage.

When the flowability information includes the information I4, the vehicle includes, for example, the following configuration. The vehicle includes, for example, a timer that measures an elapsed time since a time point when the fluid F is first used. A measurement result of the timer is transmitted to the processing circuitry. As one example, the information I4 includes a measurement time T1 of the timer. Herein, when the measurement time T1 of the timer is not less than a predetermined reference time T0, the vehicle may be in a state where: the flowability of the fluid F decreases by aging degradation; the transmission of the power from the driving source E to the transmission TM is performed; and the creep phenomenon due to the fluid F occurs. Therefore, the measurement time T1 of the timer can be utilized as the flowability information indicating the value related to the flowability of the fluid F.

Specifically, when the power interruption condition is satisfied, the processing circuitry determines whether or not the measurement time T1 of the timer is not less than the reference time T0 that is a predetermined reference value. When the processing circuitry determines that the measurement time T1 of the timer is less than the reference time T0, the processing circuitry controls the speed change actuator AC1 to set the transmission TM to the first gear stage. Moreover, when the processing circuitry determines that the measurement time T1 of the timer is not less than the reference time T0, the processing circuitry controls the speed change actuator AC1 to set the transmission TM to the second gear stage. One example of the timer is a real-time clock included in the processor 400. However, the timer is not limited to this.

Or, when the flowability information includes the information I4, the vehicle includes, for example, the following configuration. The vehicle 1 includes, for example, a first torque sensor that detects the torque of the output of the driving source E and a second torque sensor that detects the torque of the output of the transmission TM. The controller 40 receives a detection signal of the first torque sensor and a detection signal of the second torque sensor. As one example, the information I4 includes a differential value G1 obtained by subtracting a detected value of the second torque sensor from a detected value of the first torque sensor. Herein, when the differential value G1 is not less than a predetermined differential value G0, the vehicle may be in a state where: the flowability of the fluid F decreases by aging degradation; the transmission of the power from the driving source E to the transmission TM is performed; and the creep phenomenon due to the fluid F occurs. Therefore, the differential value G1 can be utilized as the flowability information indicating the value related to the flowability of the fluid F.

Therefore, the processing circuitry stores the differential value G1 in the storage memory 402 at a predetermined timing while the vehicle is traveling. The differential value G1 is suitably read by the processor 400 from the storage memory 402 onto the system memory 401. Then, when the power interruption condition is satisfied, the processing circuitry determines whether or not the stored differential value G1 is not less than the differential value G0 that is a predetermined reference value. When the processing circuitry determines that the differential value G1 is less than the differential value G0, the processing circuitry controls the speed change actuator AC1 to set the transmission TM to the first gear stage. Moreover, when the processing circuitry determines that the differential value G1 is not less than the differential value G0, the processing circuitry controls the speed change actuator AC1 to set the transmission TM to the second gear stage.

The transmission TM may include a dual clutch transmission (DCT). In this case, the transmission TM includes, for example, a first gear train system including gear stages belonging to a first group and a second gear train system including gear stages belonging to a second group, and further includes two interrupters C disposed so as to correspond to the respective two systems. Moreover, the type of the speed change structure 20 is not limited. The speed change structure 20 is not limited to a stepped speed change structure and may be a stepless speed change structure. Hereinafter, differences of the other embodiments from Embodiment 1 will be mainly described.

Embodiment 2

Figure 6:
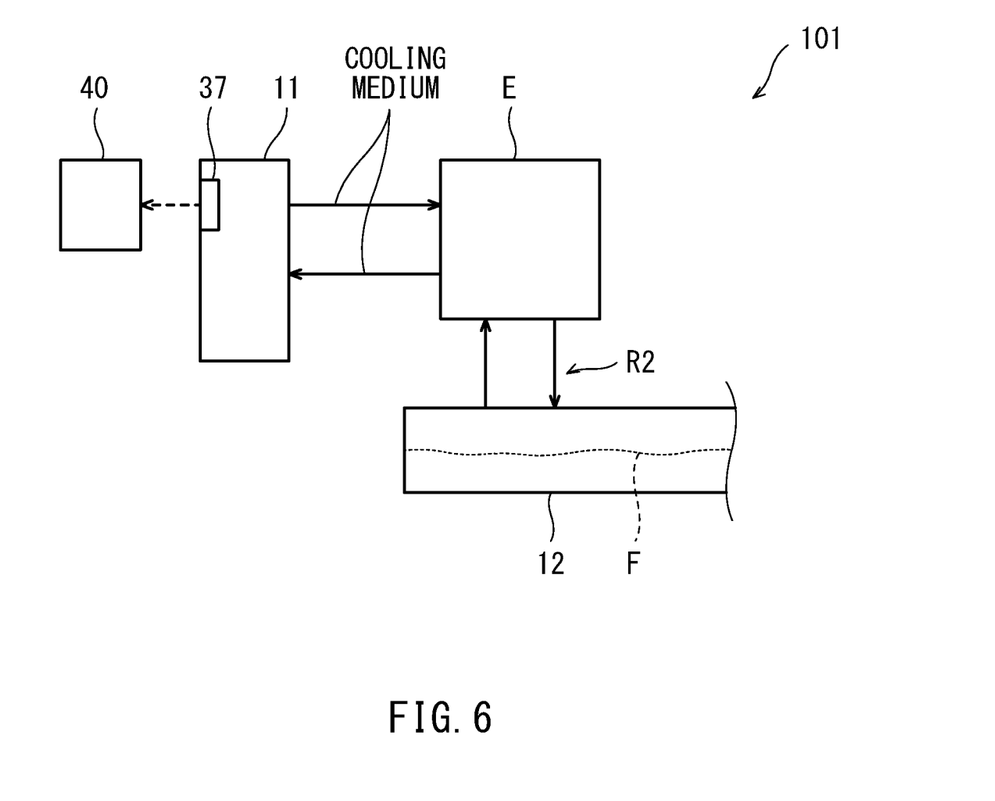
FIG. 6 is a block diagram showing the pan of the vehicle according to Embodiment 2 and its peripheral components.

FIG. 6 is a block diagram showing the pan 12 of a vehicle 101 according to Embodiment 2 and its peripheral components. As shown in FIG. 6, the vehicle 101 of the present embodiment includes the radiator 11 and a temperature sensor 37 that detects the temperature of the cooling medium. The processing circuitry receives a detection signal of the temperature sensor 37. In the present embodiment, the value V1 related to the flowability includes the temperature of the cooling medium.

Herein, the temperature of the cooling medium is proportional to each of the temperature of the driving source E and the temperature of the interrupter C connected to the driving source E. With this, the temperature of the cooling medium is also proportional to the temperature of the fluid F in the interrupter C. When the temperature of the cooling medium is high, the fluid F in the interrupter C is high in temperature and also high in flowability. Moreover, when the temperature of the cooling medium is low, the fluid F in the interrupter C is low in temperature and also low in flowability. Therefore, when the temperature of the cooling medium is lower than a certain value, there is a possibility that since the fluid F in the interrupter C is in the gaps, the creep phenomenon occurs due to the fluid F. On this account, the temperature of the cooling medium can be utilized as the flowability information indicating the value related to the flowability of the fluid F. In the present embodiment, since the processing circuitry performs Steps 1 to 3 or Steps 1, 2, and 4, the creep phenomenon due to the fluid F can be appropriately prevented.

Embodiment 3

Figure 7:
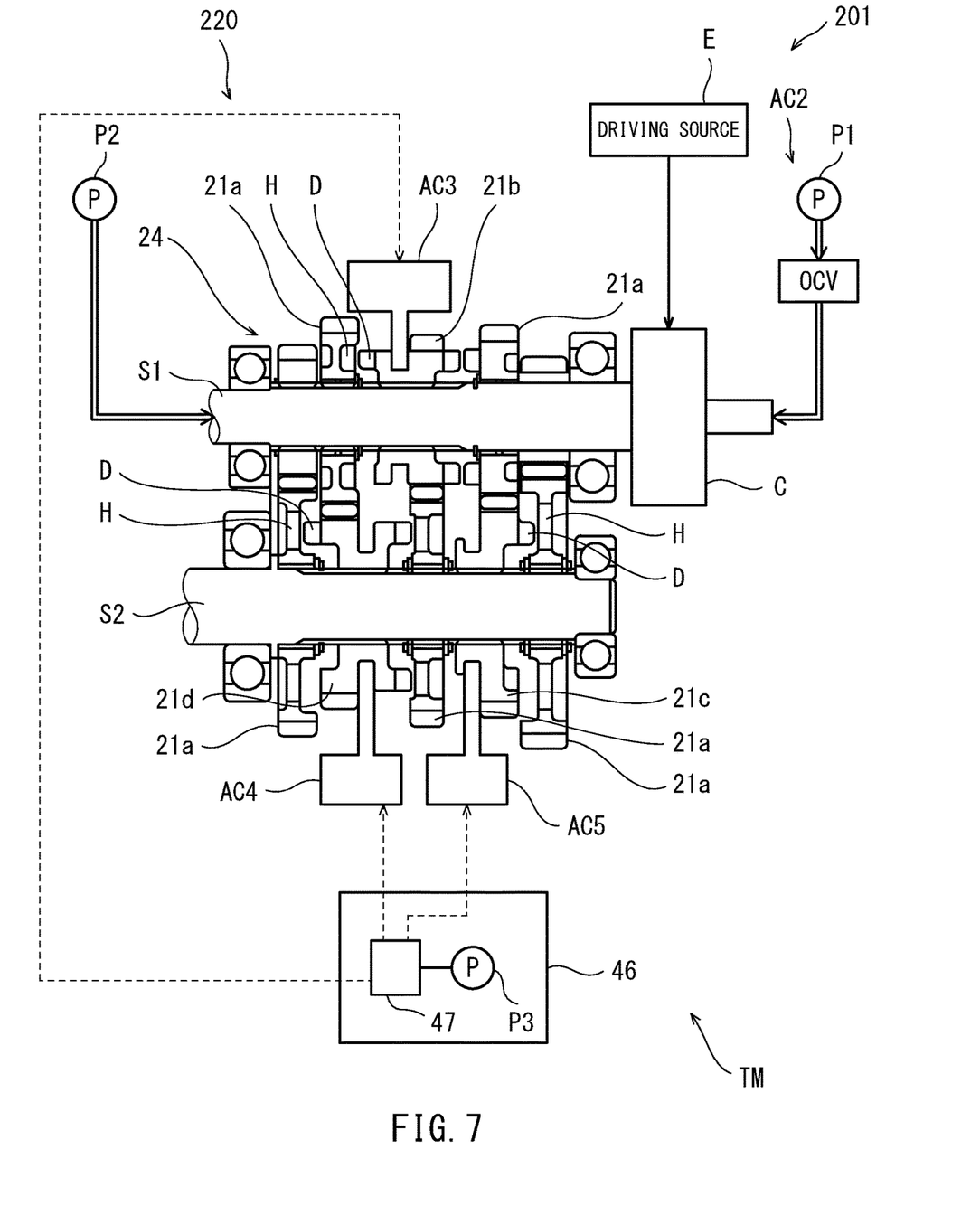
FIG. 7 is a diagram showing the internal configuration of the speed change structure of the vehicle according to Embodiment 3.

FIG. 7 is a diagram showing an internal configuration of a speed change structure 220 of a vehicle 201 according to Embodiment 3. In the vehicle 201 of the present embodiment, the transmission TM can switch the gear stages from one of any two gear stages selected from the gear stages to the other gear stage while skipping an adjacent gear stage or adjacent gear stages. When the power interruption condition is satisfied, and the processing circuitry determines that the value V1 is less than the reference value V0, the processing circuitry controls the speed change actuators AC3 to AC5 to switch the gear stages of the transmission TM from the gear stage at the time of the above determination to the second gear stage while skipping an adjacent gear stage or adjacent gear stages. According to the vehicle 201 of the present embodiment, when the power interruption condition is satisfied, the processing circuitry controls the speed change actuators AC3 to AC5 to quickly set the gear stage of the transmission TM to the second gear stage. Therefore, the occurrence of the creep phenomenon due to the fluid F can be quickly prevented.

As shown in FIG. 7, the speed change structure 220 of the transmission TM is specifically a dog gear speed change structure similar to the speed change structure 20. As the differences from the speed change structure 20, the speed change structure 220 includes speed change actuators AC3 to AC5 that make the dog gears 21b to 21d individually slide along the input shaft S1 or the output shaft S2. The dog gears 21b to 21d switch the gear stages of the transmission TM through a neutral stage by which the power is not transmitted from the input shaft S1 to the output shaft S2. The speed change actuators AC3 to AC5 are arranged individually with respect to the dog gears 21b to 21d and make the corresponding dog gears 21b to 21d slide along the input shaft S1 or the output shaft S2.

Each of the speed change actuators AC3 to AC5 in the present embodiment is a hydraulic actuator and includes a hydraulic cylinder. The hydraulic cylinder includes: a rod that makes the dog gear 21b, 22c, or 21d slide; and a cylinder main body including an inner portion from which the rod projects and into which the rod retracts. The vehicle 201 includes a pump structure 46. The pump structure 46 includes a hydraulic pump P3 that operates syringes of the speed change actuators AC3 to AC5 by the hydraulic pressure. The hydraulic pump P3 is controlled by the processing circuitry. The pump structure 46 further includes a switching valve 47 that switches operating oil passages such that the operating oil is supplied from the hydraulic pump P3 to each of the speed change actuators AC3 to AC5. The processing circuitry controls the switching valve 47 such that the hydraulic pressure of the operating oil of the hydraulic pump P3 is selectively applied to any one of the speed change actuators AC3 to AC5.

In the vehicle 201, when the power interruption condition is satisfied, and the processing circuitry determines that the value V1 is not less than the predetermined reference value V0, the processing circuitry controls the switching valve 47 and the hydraulic pump P3 so as to maintain a predetermined dog gear among the dog gears 21b to 21d at a position of the neutral stage and switch the gear stages of the transmission TM from the gear stage at the time of the above determination to the second gear stage by the remaining dog gears while skipping an adjacent gear stage or adjacent gear stages. With this, the transmission TM is quickly switched to a target gear stage.

For example, the speed change actuators AC3 to AC5 may be driven by a fluid other than the operating oil. Moreover, each of the speed change actuators AC3 to AC5 may be an electric actuator that is driven by an electric motor and includes a ball screw structure or a solenoid structure. Furthermore, the number of speed change actuators can be suitably changed in accordance with, for example, the number of dog gears included in the speed change structure.

Other Modified Examples

Hereinafter, Modified Examples regarding the power interruption condition will be described. When the vehicle 1 stops on an inclined road surface, the processing circuitry may increase or decrease, in accordance with an inclination angle of the road surface, a determination reference value regarding whether or not the power interruption condition is satisfied. For example, when the power interruption condition includes a condition that the vehicle speed is less than a predetermined threshold, and the vehicle 1 stops on the inclined road surface, the processing circuitry may increase or decrease the threshold in accordance with the inclination angle of the road surface.

As a specific example, the vehicle 1 includes an angle sensor that detects an inclination angle of a vehicle body. The controller 40 receives a detection signal of the angle sensor. The processing circuitry determines whether or not the inclination angle of the vehicle 1 which is an angle of depression when viewed from an occupant of the vehicle 1 who faces forward is not less than a predetermined first reference angle. When the vehicle 1 stops on the road surface of a downward slope inclined at not less than the first reference angle (i.e., a downward slope having a large angle of depression), the processing circuitry determines that the inclination angle of the vehicle 1 is not less than the first reference angle. In this case, the processing circuitry sets the threshold to a smaller value. According to this configuration, even when there is a possibility that the creep phenomenon of the vehicle 1 occurs by relatively small torque since the vehicle 1 stops on the road surface of the downward slope and faces in a downward direction, the occurrence of the creep phenomenon can be prevented.

Moreover, the processing circuitry determines whether or not the inclination angle of the vehicle 1 which is an angle of elevation when viewed from the occupant of the vehicle 1 is not less than a predetermined second reference angle. When the vehicle 1 stops on the road surface of a downward slope inclined at not less than the second reference angle (i.e., a downward slope having a large angle of elevation), the processing circuitry determines that the inclination angle of the vehicle 1 is not less than the second reference angle. In this case, the processing circuitry sets the threshold to a larger value. According to this configuration, when large torque is necessary to cause the creep phenomenon of the vehicle 1 since the vehicle 1 stops on the road surface of the downward slope and faces in an upward direction, the number of timings at which the processing circuitry performs Step 3 is set to a necessity minimum, and therefore, the load of the processing circuitry can be reduced.

Moreover, the processing circuitry may increase or decrease, in accordance with frictional resistance of the road surface on which the vehicle 1 stops, the determination reference value regarding whether or not the power interruption condition is satisfied. In this case, as a specific example, the vehicle 1 includes a friction coefficient sensor (for example, a tactile sensor) that detects a friction coefficient of the road surface. The friction coefficient sensor is, for example, arranged on a portion of the front wheel 3 or the rear wheel 4 which contacts the road surface. The controller 40 receives a detection signal of the friction coefficient sensor. The processing circuitry determines based on the detection signal of the friction coefficient sensor whether or not a friction coefficient value of the road surface is not less than a predetermined reference friction coefficient value. When the processing circuitry determines that the friction coefficient value of the road surface is not less than the predetermined reference friction coefficient value, the processing circuitry sets the threshold to a larger value. According to this configuration, when large torque is necessary to cause the creep phenomenon of the vehicle 1 since the vehicle 1 stops on the road surface having a large friction coefficient value, the number of timings at which the processing circuitry performs Step 3 is set to a necessity minimum, and therefore, the load of the processing circuitry can be reduced.

Moreover, the processing circuitry may increase or decrease, in accordance with a mounted load amount of the vehicle 1, the determination reference value regarding whether or not the power interruption condition is satisfied. In this case, as a specific example, the vehicle 1 includes a load sensor that detects the mounted load amount of the vehicle 1. The load sensor is arranged at, for example, a suspension that is included in the vehicle 1 and supports the front wheel 3 or the rear wheel 4. The controller 40 receives a detection signal of the load sensor. The processing circuitry determines based on the detection signal of the load sensor whether or not the mounted load amount of the vehicle 1 is not less than a predetermined reference load amount. When the processing circuitry determines that the mounted load amount of the vehicle 1 is not less than the reference load amount, the processing circuitry sets the threshold to a larger value. According to this configuration, when large torque is necessary to cause the creep phenomenon of the vehicle 1 since the mounted load amount of the vehicle 1 is relatively large, the number of timings at which the processing circuitry performs Step 3 is set to a necessity minimum, and therefore, the load of the processing circuitry can be reduced.

Moreover, when a drive mode of the vehicle 1 is switchable between a two-wheel drive mode and a four-wheel drive mode, the processing circuitry may increase or decrease, in accordance with the drive mode, the determination reference value regarding whether or not the power interruption condition is satisfied. In this case, as a specific example, the vehicle 1 includes a torque sensor (drive mode torque sensor) that detects the torque of the driving source E transmitted to the front wheels 3 and the rear wheels 4. This torque sensor is arranged at, for example, a portion of a power transmitting route through which the driving power of the driving source E is transmitted to each driving wheel. The controller 40 receives a detection signal of the torque sensor. The processing circuitry determines based on the detection signal of the torque sensor whether the drive mode of the vehicle 1 is the two-wheel drive mode or the four-wheel drive mode. When the processing circuitry determines that the drive mode of the vehicle 1 is the two-wheel drive mode, the processing circuitry sets the threshold to a smaller value. With this, even when the drive mode of the vehicle 1 is the two-wheel drive mode, and there is a possibility that the creep phenomenon of the vehicle 1 occurs by smaller torque than the four-wheel drive mode, the occurrence of the creep phenomenon of the vehicle 1 can be prevented.

Moreover, when the processing circuitry determines that the drive mode of the vehicle 1 is the four-wheel drive mode, the processing circuitry sets the threshold to a larger value. With this, since the drive mode of the vehicle 1 is the four-wheel drive mode, the driving power transmitted to each driving wheel is smaller than that in the two-wheel drive mode, and therefore, larger torque than the two-wheel drive mode is necessary to cause the creep phenomenon of the vehicle. In such a case, the number of timings at which the processing circuitry performs Step 3 is set to a necessity minimum, and therefore, the load of the processing circuitry can be reduced.

Moreover, when a gear mode of a differential gear which is included in the vehicle 1 and to which the driving power of the driving source E is transmitted is switchable between a lock mode in which a differential function is locked and an unlock mode in which the differential function is unlocked, the processing circuitry may increase or decrease, in accordance with the gear mode, the determination reference value regarding whether or not the power interruption condition is satisfied. In this case, as a specific example, in the vehicle 1, the controller 40 receives information indicating that the gear mode of the differential gear is the lock mode or information indicating that the gear mode of the differential gear is the unlock mode. The processing circuitry determines based on the received information whether the gear mode of the differential gear is the lock mode or the unlock mode. When the processing circuitry determines that the gear mode of the differential gear is the lock mode, the processing circuitry sets the threshold to a smaller value. According to this configuration, when the gear mode of the differential gear is the lock mode, and therefore, larger torque than the unlock mode is necessary to cause the creep phenomenon of the vehicle 1, the number of timings at which the processing circuitry performs Step 3 is set to a necessity minimum, and therefore, the load of the processing circuitry can be reduced.

Moreover, in accordance with whether or not the vehicle 1 is performing a cold operation, the processing circuitry may increase or decrease the determination reference value regarding whether or not the power interruption condition is satisfied. In this case, as a specific example, the vehicle 1 includes a temperature sensor (cold temperature sensor) that detects the temperature of the driving source E or the temperature of a vicinity of the driving source E. The controller 40 receives a detection signal of the temperature sensor. The processing circuitry determines whether or not the detection signal of the temperature sensor is not less than a predetermined reference cold temperature. When the processing circuitry determines that the detection signal of the temperature sensor is less than the reference cold temperature, the processing circuitry sets the threshold to a larger value. According to this configuration, since the detection signal of the temperature sensor is less than the reference cold temperature, the vehicle 1 is performing the cold operation, and resistance of a lubrication portion in the driving source E is higher than that in operations other than the cold operation. Therefore, larger torque than the cold operation is necessary to cause the creep phenomenon of the vehicle 1. In such a case, the number of timings at which the processing circuitry performs Step 3 is set to a necessity minimum, and therefore, the load of the processing circuitry can be reduced.

Moreover, in accordance with whether or not the vehicle 1 is performing a warming-up operation, the processing circuitry may increase or decrease the determination reference value regarding whether or not the power interruption condition is satisfied. In this case, as a specific example, the vehicle 1 includes a temperature sensor (warming-up temperature sensor) that detects the temperature of the driving source E or the temperature of a vicinity of the driving source E. The controller 40 receives a detection signal of the temperature sensor. The processing circuitry determines whether or not conditions that: the detection signal of the temperature sensor is not less than a predetermined reference warming-up temperature; an elapsed time since the start of the driving source E is a predetermined time or less; and choke control of supplying a fuel-air mixture, in which the concentration of a fuel component is high, to the internal combustion engine of the driving source E is performed are satisfied. When the processing circuitry determines that the above conditions are satisfied, the processing circuitry sets the threshold to a smaller value. According to this configuration, since the above conditions are satisfied, the vehicle 1 is performing the warming-up operation, and there is a possibility that the creep phenomenon of the vehicle 1 occurs by relatively low torque. Even in such a case, the occurrence of the creep phenomenon can be prevented.

Moreover, in accordance with whether or not atmospheric pressure is low, the processing circuitry may increase or decrease the determination reference value regarding whether or not the power interruption condition is satisfied. In this case, as a specific example, the vehicle 1 includes an atmospheric pressure sensor. The controller 40 receives a detection signal of the atmospheric pressure sensor. The processing circuitry determines whether or not an atmospheric pressure value indicated by the detection signal of the atmospheric pressure sensor is not less than a predetermined reference atmospheric pressure value. When the processing circuitry determines that the atmospheric pressure value indicated by the detection signal of the atmospheric pressure sensor is less than the reference atmospheric pressure value, the processing circuitry sets the threshold to a larger value. According to this configuration, since the atmospheric pressure value indicated by the detection signal of the atmospheric pressure sensor is less than the predetermined reference atmospheric pressure value, an adequate amount of fuel-air mixture containing fuel is hardly supplied to the internal combustion engine of the driving source E, and therefore, the creep phenomenon of the vehicle 1 by high torque hardly occurs. In such a case, the number of timings at which the processing circuitry performs Step 3 is set to a necessity minimum, and therefore, the load of the processing circuitry can be reduced.

Moreover, in accordance with whether or not the fuel supplied to the internal combustion engine of the driving source E contains ethanol, the processing circuitry may increase or decrease the determination reference value regarding whether or not the power interruption condition is satisfied. In this case, as a specific example, the vehicle 1 includes a concentration sensor (for example, a semiconductor sensor) that detects an ethanol concentration of the fuel. The controller 40 receives a detection signal of the concentration sensor. The processing circuitry determines based on the detection signal of the concentration sensor whether or not the fuel contains ethanol. When the processing circuitry determines that the fuel contains ethanol, the processing circuitry sets the threshold to a larger value. According to this configuration, since the fuel contains ethanol, the output of the driving source E is lower than that of normal fuel containing gasoline. Thus, since the creep phenomenon of the vehicle 1 by high torque hardly occurs, the number of timings at which the processing circuitry performs Step 3 is set to a necessity minimum, and therefore, the load of the processing circuitry can be reduced.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

As described above, the embodiments have been described as examples of the technology disclosed in the present application. However, the technology in the present disclosure is not limited to these and is also applicable to embodiments in which modifications, replacements, additions, omissions, and the like are suitably made. Moreover, a new embodiment may be prepared by combining the components described in the above embodiments. For example, some components or methods in one embodiment may be applied to another embodiment. Some components in an embodiment may be separated and arbitrarily extracted from the other components in the embodiment. Furthermore, the components shown in the attached drawings and the detailed explanations include not only components essential to solve the problems but also components for exemplifying the above technology and not essential to solve the problems. The vehicle 1 is not limited to a four-wheeled vehicle and may be a motorcycle, an automatic three-wheeled vehicle, or the like.

What is claimed is:

1. A vehicle comprising:
   a traveling driving source;
   a transmission including a speed change actuator and a speed change structure that is driven by the speed change actuator to change a speed of driving power of the driving source, the transmission switching gear stages from one of any two gear stages selected from the gear stages to the other gear stage while skipping an adjacent gear stage or adjacent gear stages;
   an interrupter that includes a first connector connected to the driving source, a second connector connected to the transmission, and a fluid in a gap between the first connector and the second connector, and establishes or interrupts a power transmitting route through which the driving power is transmitted from the first connector to the second connector;
   processing circuitry that controls the speed change actuator of the transmission; and a driving wheel to which the driving power of the driving source is transmitted, wherein:
the processing circuitry receives flowability information indicating a value related to flowability of the fluid;
the processing circuitry determines whether or not a predetermined power interruption condition for interrupting transmission of the driving power from the driving source to the driving wheel is satisfied;
when the power interruption condition is satisfied, and the processing circuitry determines that the value related to the flowability is less than a predetermined reference value, the processing circuitry controls the speed change actuator to set the transmission to a first gear stage; and
when the power interruption condition is satisfied, and the processing circuitry determines that the value related to the flowability is not less than the reference value, the processing circuitry controls the speed change actuator to skip the adjacent gear stage or the adjacent gear stages and thereby set the transmission from the gear stage at the time of the determination to a second gear stage having a lower reduction ratio than the first gear stage.

2. The vehicle according to claim 1, wherein the value related to the flowability includes a value related to viscosity of the fluid.

3. The vehicle according to claim 1, further comprising:
a circulation passage through which the fluid circulates inside the driving source; and
a detection sensor that detects a state of the fluid flowing through the circulation passage.

4. The vehicle according to claim 1, further comprising a temperature sensor that detects a temperature of the fluid, wherein:
the processing circuitry receives a detection signal of the temperature sensor; and
the value related to the flowability includes the temperature of the fluid.

5. The vehicle according to claim 4, further comprising:
a pan that stores the fluid; and
a circulation passage through which the fluid circulates between the interrupter and the pan, wherein
the temperature sensor detects the temperature of the fluid stored in the pan.

6. The vehicle according to claim 1, wherein the fluid is lubricating oil that lubricates a lubricated portion of the driving source or a lubricated portion of a power transmitting structure that transmits the driving power of the driving source from the driving source to the driving wheel.

7. The vehicle according to claim 3, further comprising:
a radiator that cools a cooling medium that has cooled the driving source; and
a temperature sensor that detects a temperature of the cooling medium, wherein:
the processing circuitry receives a detection signal of the temperature sensor; and
the value related to the flowability includes the temperature of the cooling medium.

8. The vehicle according to claim 1, wherein:
when the gear stage of the transmission is the second gear stage, and the vehicle is in a stop state, the processing circuitry acquires traveling start information indicating that the vehicle starts traveling; and
in accordance with the acquisition of the traveling start information, the processing circuitry controls the speed change actuator to change the gear stage of the transmission from the second gear stage to a gear state having a higher reduction ratio than the second gear stage.

9. The vehicle according to claim 1, wherein the flowability information includes at least one of:
information regarding power transmitting efficiency between the driving source and the transmission;
information regarding the driving source and a vehicle speed;
information regarding pump pressure of a pump that is included in the vehicle and pressurizes the fluid; or
information regarding deterioration of the fluid.

10. The vehicle according to claim 1, wherein the power interruption condition includes a condition that a vehicle speed is less than a predetermined threshold.

11. The vehicle according to claim 1, wherein the interrupter is a friction clutch in which the driving power is transmitted from the first connector to the second connector by frictional contact between the first connector and the second connector.

12. The vehicle according to claim 1, further comprising an interrupter actuator that drives the first connector and the second connector by hydraulic pressure such that the first connector and the second connector are brought into contact with each other or are separated from each other.

13. The vehicle according to claim 1, further comprising a display that displays a gear stage of the transmission.

14. A vehicle comprising:
a traveling driving source;
a transmission including a speed change actuator and a speed change structure that is driven by the speed change actuator to change a speed of driving power of the driving source, the transmission switching gear stages from one of any two gear stages selected from the gear stages to the other gear stage while skipping an adjacent gear stage or adjacent gear stages;
an interrupter that includes a first connector connected to the driving source, a second connector connected to the transmission, and a fluid in a gap between the first connector and the second connector, and establishes or interrupts a power transmitting route through which the driving power is transmitted from the first connector to the second connector;
processing circuitry that controls the speed change actuator of the transmission; and
a driving wheel to which the driving power of the driving source is transmitted, wherein:
the processing circuitry receives flowability information indicating a value related to flowability of the fluid;
the processing circuitry determines whether or not a predetermined power interruption condition for interrupting transmission of the driving power from the driving source to the driving wheel is satisfied; and
when the power interruption condition is satisfied, and the processing circuitry determines that the value related to the flowability is not less than a predetermined reference value, the processing circuitry controls the speed change actuator to skip the adjacent gear stage or the adjacent gear stages and thereby set the transmission from the gear stage at the time of the determination to a gear stage having a reduction ratio lower than a maximum reduction ratio.

15. A vehicle comprising:
a traveling driving source;

a transmission including a speed change actuator and a speed change structure that is driven by the speed change actuator to change a speed of driving power of the driving source;

an interrupter that includes a first connector connected to the driving source, a second connector connected to the transmission, and a fluid in a gap between the first connector and the second connector, and establishes or interrupts a power transmitting route through which the driving power is transmitted from the first connector to the second connector;

processing circuitry that controls the speed change actuator of the transmission; and a driving wheel to which the driving power of the driving source is transmitted, wherein:

the processing circuitry receives flowability information indicating a value related to flowability of the fluid;

the processing circuitry determines whether or not a predetermined power interruption condition for interrupting transmission of the driving power from the driving source to the driving wheel is satisfied;

when the power interruption condition is satisfied, and the processing circuitry determines that the value related to the flowability is not less than a predetermined reference value, the processing circuitry controls the speed change actuator to set the transmission to a gear stage having a reduction ratio lower than a maximum reduction ratio;

when the gear stage of the transmission is a second gear stage, and the vehicle is in a stop state, the processing circuitry acquires traveling start information indicating that the vehicle starts traveling; and in accordance with the acquisition of the traveling start information, the processing circuitry controls the speed change actuator to change the gear stage of the transmission from the second gear stage to a gear state having a higher reduction ratio than the second gear stage.

* * * * *